No. 781,626. PATENTED JAN. 31, 1905.
G. F. THOMPSON.
COUPLING FOR WAGON OR CARRIAGE SPRINGS.
APPLICATION FILED MAR. 2, 1904.

WITNESSES

INVENTOR
GEORGE F. THOMPSON
BY Paul & Paul
HIS ATTORNEYS

No. 781,626. PATENTED JAN. 31, 1905.
G. F. THOMPSON.
COUPLING FOR WAGON OR CARRIAGE SPRINGS.
APPLICATION FILED MAR. 2, 1904.
2 SHEETS—SHEET 2.
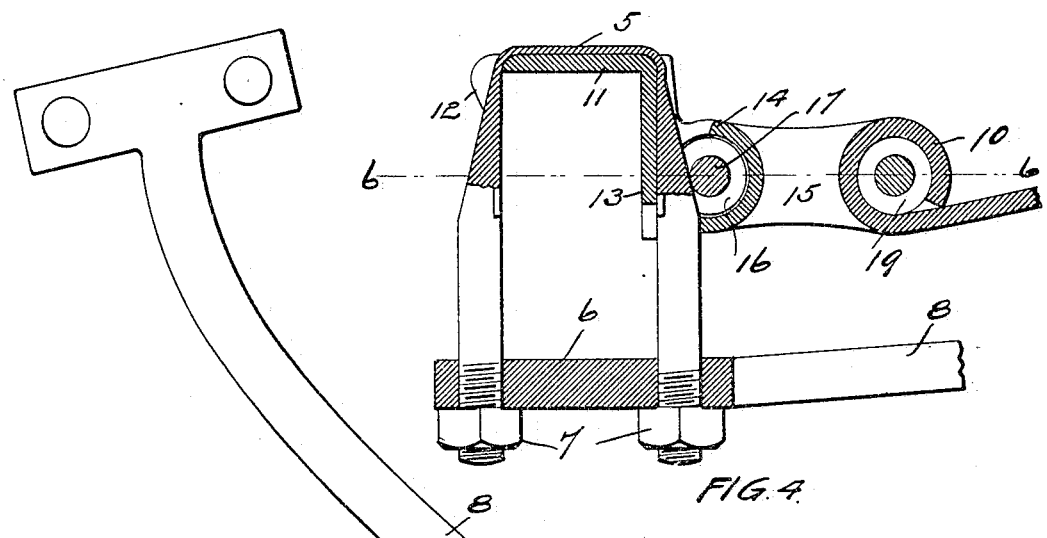
FIG. 4.
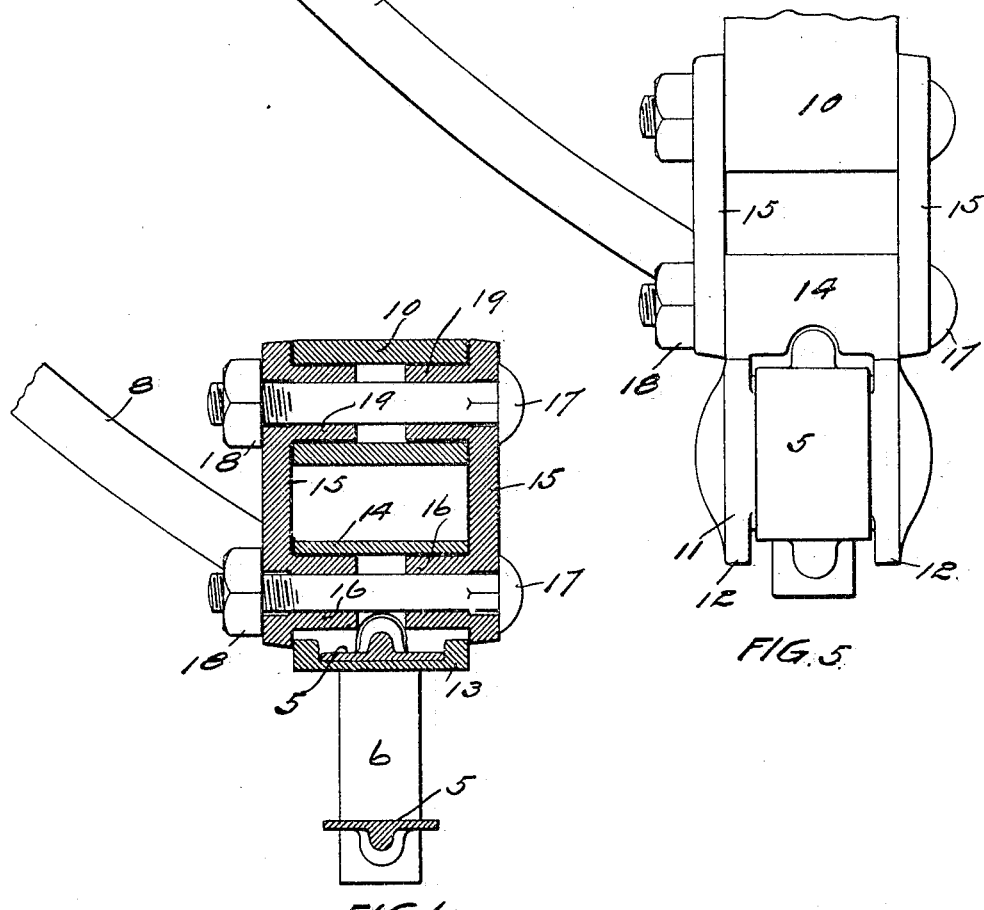
FIG. 5.
FIG. 6.
WITNESSES
E. G. Strande
Q. G. Hanson.
INVENTOR
GEORGE F. THOMPSON
BY Paul & Paul
HIS ATTORNEYS No. 781,626. Patented January 31, 1905.

UNITED STATES PATENT OFFICE.

GEORGE F. THOMPSON, OF MINNEAPOLIS, MINNESOTA.

COUPLING FOR WAGON OR CARRIAGE SPRINGS.

SPECIFICATION forming part of Letters Patent No. 781,626, dated January 31, 1905.

Application filed March 2, 1904. Serial No. 196,148.

*To all whom it may concern:*

Be it known that I, GEORGE F. THOMPSON, of Minneapolis, in the county of Hennepin, State of Minnesota, have invented certain new and useful Improvements in Couplings for Wagon or Carriage Springs, of which the following is a specification.

This invention relates to improvements in couplings for carriage or wagon springs, and particularly to couplings designed for connecting side springs to axles where the axle-stocks are formed integrally with the reaches, as shown and described in Letters Patent of the United States, No. 630,425, issued to me August 8, 1899.

The invention consists generally in the constructions and combinations hereinafter described, and particularly pointed out in the claims.

Figure 1:
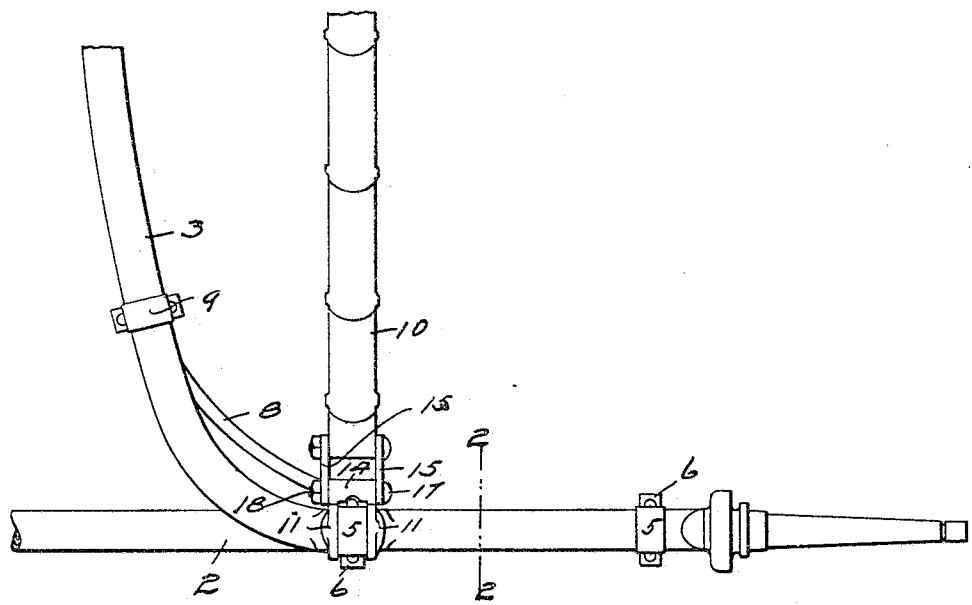
Figure 2:
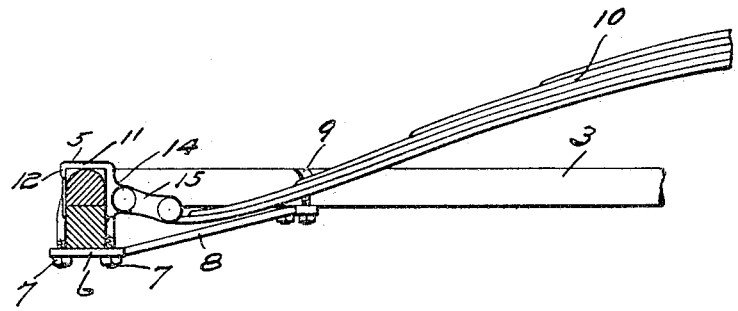
Figure 3:
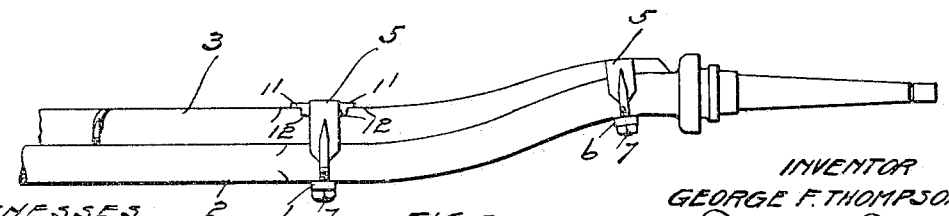

In the accompanying drawings, forming part of this specification, Figure 1 is a plan view of a portion of a wagon-axle, reach, and spring with my improved coupling arranged in connection therewith. Fig. 2 is a section on line 2 2 of Fig. 1. Fig. 3 is an elevation of a portion of the axle with the coupling in position thereon. Fig. 4 is a detail section of a coupling on a larger scale than that shown in Figs. 1, 2, and 3. Fig. 5 is a plan view of the coupling. Fig. 6 is a horizontal section on line 6 6 of Fig. 4.

In the drawings, 2 represents the axle, which preferably has a depressed central portion similar to that shown in the drawing of my former patent hereinbefore referred to.

3 represents one of the curved reaches which extends from the bolster over the forward axle (not shown) to the rear axle and at its rear end is brought into line with the axle and is bent upward to conform to the upper surface of the axle.

5 5 are U-shaped clips encircling the axle and the portion of the reach that rests upon the axle, these clips being secured in position by the plates 6, arranged under the axle and provided with openings through which the legs of the clips extend. Nuts 7 are arranged upon the threaded ends of the legs of the clips, and by these nuts the clips and the plates 6 are clamped firmly in position, thereby rigidly securing the rear portion of the reaches to the axles. It will be seen that these portions of the reaches that are secured to the axle form the axle-stock, as described in my former patent above referred to. The plate 6 for the inner clip is preferably formed integrally with a brace 8, which has its other end connected to the under side of the reach by the clip 9. I prefer to connect the end of the springs 10 to the axle by a coupling plate and links so arranged as to make the connection at a point about half-way between the plate 6 and the top of the clip 5. For this purpose I provide a coupling-plate 11, which is arranged within the clip 5 (see Figs. 4, 5, and 6) and which extends across the under side of the top of the clip and has the lugs 12 projecting downward outside of and in line with the side wall of the clip (see Fig. 4) and which has also the downwardly-extending side plate 13 arranged inside of the other wall of the clip. (See Fig. 4.) Arranged outside of the clip, but formed integrally with the plate 13, is the coupling-sleeve 14, an opening being provided between this sleeve and the plate 13 for the passage of one portion of the clip. (See Fig. 4.) Coupling-links 15, provided with sleeves 16, that project into the sleeve 14, are arranged at the opposite ends of the said sleeve 14, and said links are secured in position by a suitable bolt 17 and nut 18. The links 15 are also provided with the inwardly-projecting sleeves 19, which engage the end of the spring 10 and form a pivotal connection therewith. These links form a swinging connection between the end of the spring and the coupling-plate 11.

Where a curved reach is employed, the ordinary spring-coupling, which is generally connected to the top of the reach, tends to twist this part of the reach off from the axle. Where the ordinary axle-stock is used with a straight reach connecting the rear axle and the forward bolster, it is immaterial that the springs may be coupled to the top of the axle-stock, as the tendency to twist the stock is counteracted by the straight reaches between the rear axle-stock and the forward bolster; but where the axle-stock is formed integrally with the reach, as in my patent above referred to, any connection between the spring and the top of that portion of the reach which forms the axle-stock is detrimental in that it tends to twist this portion of the reach off from the axle. To obviate this, I provide the separate coupling-plate 11, as already described, which is arranged within the clip and extending down one side thereof has a coupling-sleeve located near its lower end, thus bringing said sleeve to a point nearly opposite the line between the top of the axle and the bottom of the portion of the reach that forms the axle-stock. This coupling-plate is of course firmly secured in position by means of the clip described, and the downwardly-projecting lugs 12 engage the rear side of the combined reach and axle-stock and assist in keeping the coupling-plate in proper position.

It will be understood that the details of the construction may be varied in many particulars without departing from my invention.

I claim as my invention—

1. The combination, with the axle and axle-stock and a wagon or carriage spring, of a clip engaging said axle and axle-stock, a coupling-plate arranged within said clip and provided with a coupling-sleeve located outside of said clip, coupling-links connecting said sleeve and the end of said spring and the pivot of said sleeve being horizontal and substantially opposite the contacting surface of said axle and axle-stock whereby a direct pull on said clip is provided, for the purpose specified.

2. The combination, with an axle and a combined reach and axle-stock, of a clip engaging said axle-stock, a coupling-plate arranged within said clip and provided with a coupling-sleeve located outside of said clip and below the upper portion thereof whereby a direct pull will be exerted on the clip, and coupling-links connected to said spring and having a horizontal pivotal connection with said sleeve, substantially as described.

In witness whereof I have hereunto set my hand this 18th day of February, 1904.

GEORGE F. THOMPSON.

In presence of—
A. C. PAUL,
C. G. HANSON.